ively applied to a vehicle, whereby
UNITED STATES PATENT OFFICE.

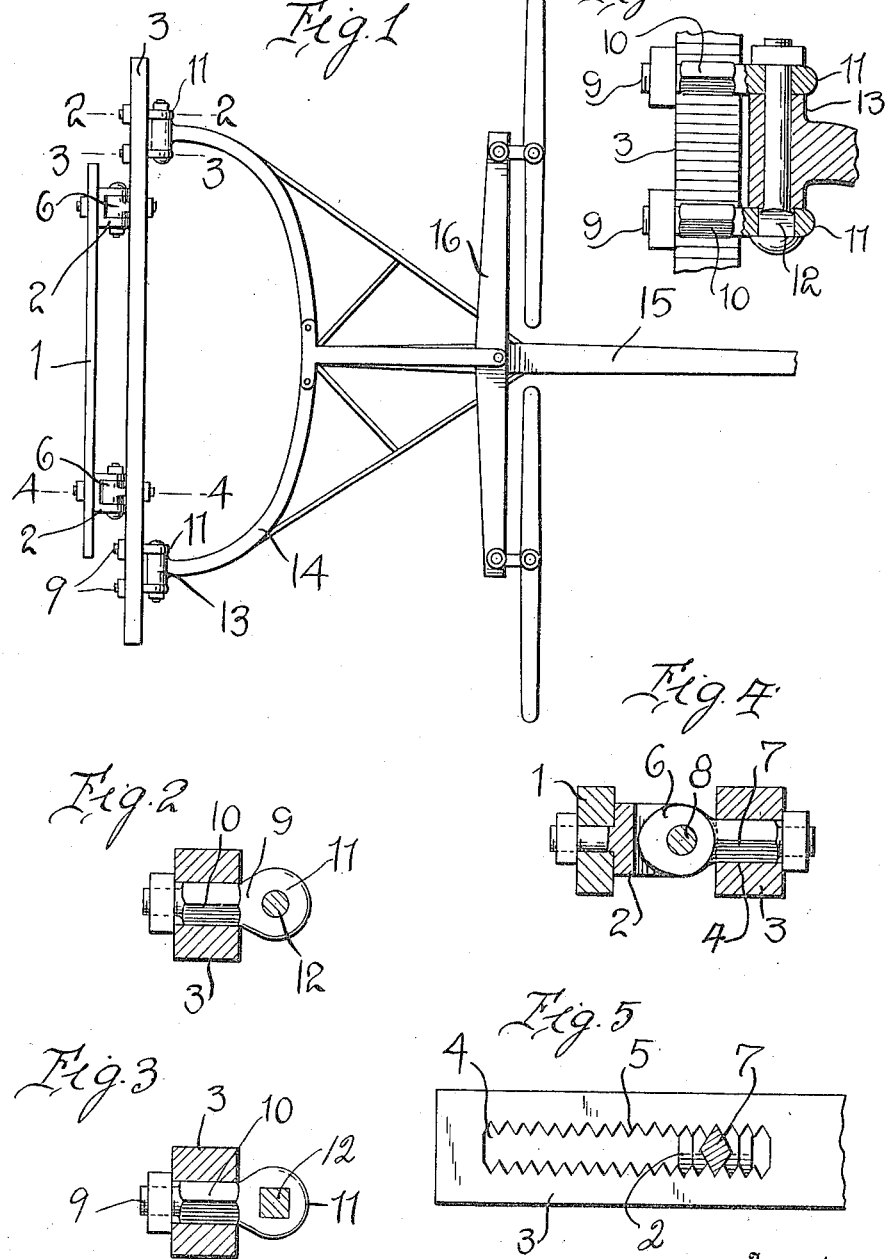

WILLIAM E. RAYMOND, OF SPENCER, NEW YORK.

ATTACHMENT FOR VEHICLES.

1,158,556. Specification of Letters Patent. Patented Nov. 2, 1915.

Application filed December 12, 1914. Serial No. 876,940.

*To all whom it may concern:*

Be it known that I, WILLIAM E. RAYMOND, a citizen of the United States, residing at Spencer, in the county of Tioga and State of New York, have invented certain new and useful Improvements in Attachments for Vehicles, of which the following is a specification, reference being had to the accompanying drawings.

This invention relates to new and useful improvements in attachments for vehicles and more particularly to a device which is adapted to be applied to a vehicle, whereby a pole or a pair of thills can be readily applied to any vehicle or sleigh, the main object of the present invention being the provision of a device of the above character which can be used for attaching a pole or a pair of thills to a wagon, buggy, sleigh or any other form of vehicle wherein the attaching devices are arranged a different distance apart, said device being provided with means adjustable so that different size thills and tongues may be readily applied to any form of vehicle.

Another object of the present invention is the provision of a device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a top plan view illustrating the application of my invention. Fig. 2 is a transverse sectional view taken on the line 2—2, Fig. 1. Fig. 3 is a transverse sectional view taken on the line 3—3, Fig. 1. Fig. 4 is a transverse sectional view taken on the line 4—4, Fig. 1. Fig. 5 is a side elevation of one end of the attaching plate; and Fig. 6 is a transverse sectional view through the heads of one set of the outer bolts.

Referring more particularly to the drawing, 1 indicates a securing bar which is attached to a vehicle in any well known manner and provided with the clips 2 to which my improved attaching bar 3 is removably secured. The bar 3 is provided adjacent each end with longitudinal slots 4, the side walls of which are provided with a plurality of V-shaped notches 5, the purpose of which will be hereinafter more fully set forth. In securing the bar 3 to a vehicle, so that a pole or thills may be readily attached to a vehicle, I provide suitable bolts 6, the shanks of which are substantially diamond shaped, as shown at 7 and are adapted to be arranged within the slots 4, so that the pointed edges thereof will be arranged within the notches 5 upon opposite sides of the slots. The heads of the bolts are formed in the shape of sleeves and are arranged within the clips 2 and securely retained in position by means of the transverse bolts 8.

The portion 7 of each of the bolts 6 is arranged within the inner end of each slot 4 and as shown in Fig. 1, the bolts 9 which are provided with rectangular shanks 10 are arranged within the slots 4 adjacent the outer ends thereof. These bolts are provided with perforated heads 11 adapted to receive the securing bolts 12. As shown in Fig. 3, one of the bolts 9 is provided with a substantially rectangular opening to receive a rectangular portion of the bolt 12 so as to prevent this bolt from rotating, it being understood that the sleeves 13 at the inner ends of the yoke 14 will rotate upon these bolts 12.

The yoke 14 is arranged at the inner end of a pole 15 having thereon the double-tree 16. It will be apparent that in detaching this pole 15 and in attaching a pair of thills to the bar, the bolts 9 may be removed from the notches in which they are and arranged according to the width of the thills, and the bolts 6 may also be adjusted within the slots 4 to be disposed in alinement with the clips carried by the vehicle so that the bar 3 may be applied to any form of vehicle and any size pole or pair of thills applied to or detached from the bar 3.

From the above it will be apparent that I have provided a simple and durable device whereby a pair of thills, a pole or other draft means may be readily applied to various kinds of vehicles. It will be noted that in placing the device in position for use, the nuts upon the threaded ends of the bolts 6 are screwed tightly up against the bar 3, so as to force the bar 3 tightly into engagement with the clips 2 which are secured to the vehicle. The device, in itself, is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I desire to claim and secure by Letters Patent, is:—

1. A device of the class described, including an attaching bar having a longitudinal slot formed in each end thereof, the side walls of said slots being provided with V-shaped notches, a removable bolt arranged within the outer end of each of the slots, said bolts being provided with diamond-shaped shanks, the corner members of said shanks being adapted to be arranged within the notches, a second bolt arranged within the inner end of each of the slots having a diamond-shaped shank, and a sleeve formed upon the inner end of each of said second bolts, for the purpose set forth.

2. A device of the class described, including an attaching bar having a longitudinal slot formed in each end thereof, the side walls of said slots being provided with notches, bolts arranged within the outer ends of said slots, said bolts being provided with non-circular shanks adapted for interlocking engagement with the notches, and other bolts arranged within the inner ends of said slots, the last named bolts being also formed with non-circular shanks engageable with the notches, as and for the purpose set forth.

In testimony whereof I hereunto affix my signature in the presence of two witnesses.

WILLIAM E. RAYMOND.

Witnesses:
 FLORENCE M. PINE,
 GERALD I. ESTELLE.

Copies of this patent may be obtained for five cents each, by addressing the "Commissioner of Patents, Washington, D. C."